3,397,358
ROTATING COIL MAGNETOMETER WITH MEANS TO COMPENSATE FOR VARIATIONS IN ROTATIONAL SPEED
Dennis Allenden, Stretford, Manchester, and Terence Trevor Harrison, Poynton, England, assignors to Associated Electrical Industries Limited, London, England, a British company
Filed Apr. 22, 1965, Ser. No. 450,148
Claims priority, application Great Britain, Apr. 27, 1964, 17,312/64
7 Claims. (Cl. 324—47)

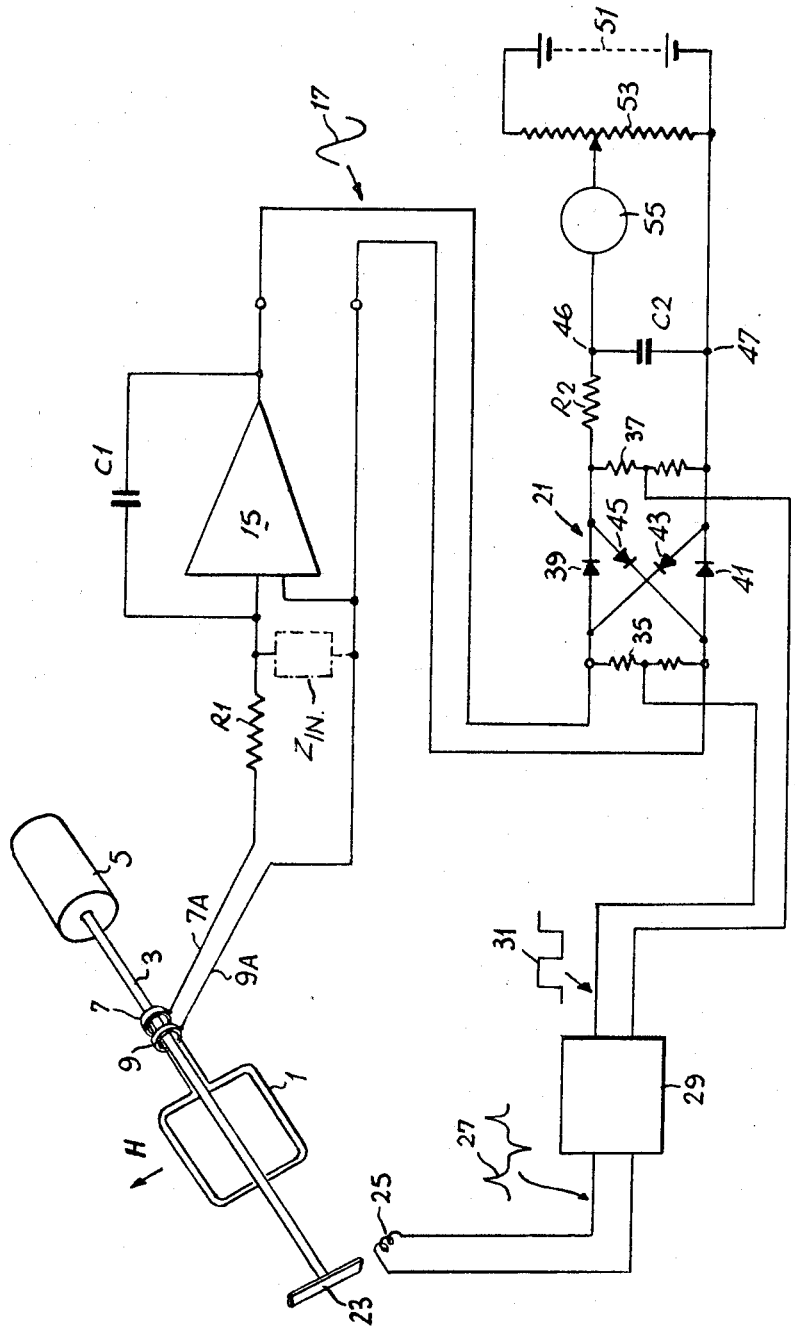

This invention relates to improvements in the measurement of magnetic flux density.

It is known to measure the magnetic flux density of a magnetic field by the measurement of the E.M.F. produced in a coil rotated in the field. The magnitude of the generated E.M.F. depends, among other things, upon the magnetic flux density and upon the mean speed of rotation of the coil in revolutions per second, and it follows that any variation in the mean speed of rotation introduces a corresponding error into the measurement.

This speed of rotation may vary by one or two percent even if the coil is driven by a synchronous motor operated from time controlled mains. This difficulty is overcome in known magnetic flux density measuring instruments by the provision of a second coil, driven by the same motor as the first coil in the field under measurement, but situated in the field of a permanent magnet. The voltage from the first coil is then compared with the voltage from the second coil by means of a calibrated potentiometer; at balance the unknown field is determined in terms of the field of the permanent magnet, which provides the calibration standard, and the setting of the potentiometer. Since both voltages are proportional to the same speed of rotation of the two coils, the velocity (r.p.m.) term disappears from the calibration of the instrument.

This technique of the use of a second coil with a permanent magnet is applicable where accuracies of no more than about 0.5% are required. It has, however, three main drawbacks. Firstly, changes in value of the permanent magnet field, due to temperature variations, ageing and ferromagnetic environment, can amount to as much as 1% even if considerable precautions are taken. Secondly, the comparison of the two E.M.F.'s cannot be made to within 0.1% accuracy and precision because the waveform of the permanent magnet coil will not be sinusoidal to the necessary degree of purity. Hence the balance point is masked, and the indicated null point will not coincide with that corresponding to a true measurement of the unknown field. Thirdly, torsional and lateral vibrations, small departures from straightness of the shaft, et cetera, modify the output waveform, producing a further uncertainty in the comparison point. The fact that both coils are mounted on the same shaft does not give automatic cancellation of these perturbations. If one seeks an overall accuracy of only 1%, their net effects can be made to be (just) insignificant; they cannot without great precision of manufacture, be reduced to the level at which they cause less than one part in 1000 perturbations of the coil voltage.

An object of the present invention is the provision of improved means for the measurement of magnetic flux density which can readily be constructed to effect measurements with a calibration accuracy and stability of better than one part in 1,000, i.e., 0.1 percent.

According to the present invention, means adapted to provide an indication or measurement of, and/or a control in accordance with, the magnitude of the magnetic flux density in a magnetic field, comprise a coil arranged in the field, means for rotating the coil at a substantially uniform speed in the field in such a manner that an E.M.F. is generated in the coil with a magnitude related to the magnetic flux density and the speed of rotation of the coil, an amplifier to which the E.M.F. from the coil is applied as input and having capacitive negative feedback and arranged to yield an output with a gain which decreases inversely in magnitude with an increase in the frequency of the input to the amplifier, a synchronous detector to which the output from the amplifier is applied and which serves to block substantially completely all frequencies which are harmonics of a basic frequency determined by the mean speed of rotation of the coil, and output means arranged to receive the output from the synchronous detector and to provide the indication or measurement of, and/or effect the control in accordance with the magnetic flux density.

The invention will now be described, by way of example, with reference to the drawing filed with the provisional specification which is a schematic representation of apparatus for the measurement of the magnitude of the magnetic flux density in a magnetic field.

In the drawing, the lines of flux in the magnetic field are denoted by the arrow H. A multiturn coil 1 is mounted on a shaft 3 arranged to be driven by a synchronous electric motor 5. Motor 5 is a four pole machine, so that when energised by a 50 cycles per second supply the coil rotates at 25 revolutions per second, and the E.M.F. generated in coil 1 has a frequency of 25 cycles per second. The shaft 3 carries two slip rings 7 and 9 connected respectively to the ends of the coil 1. These sliprings are of a known type of mercury slipring, and have output leads 7A and 9A respectively. Lead 7A is connected through a resistor $R_1$ to one input terminal of an amplifier 15, and the lead 9A is connected directly to the other input terminal of that amplifier.

The amplifier 15 is arranged to operate with a large amount of capacitive negative feedback through a capacitor $C_1$. This combination of amplifier 15, resistor $R_1$ and capacitor $C_1$ has the property that, at frequencies above frequency "$f$" given by:

$$f = \frac{1}{2\pi C_1 R_1 (1+A)}$$

(where A is the amplifier gain), its gain tends to an asymptotic value which is inversely proportional to frequency.

A synchronous detector 21 has as one input the output 17 from the amplifier 15, and as its second input a signal having exactly the same frequency as the output from the coil 1. Although, the motor 5 being synchronous, one could use a signal derived from the supply mains, it is considered better to provide the permanent magnet 23 on the shaft 3, to rotate with that shaft, and a pick-up coil 25 so arranged that the magnet 23 induces in the coil 25 a signal having the waveform indicated at 27 and having a frequency exactly the same as that of the E.M.F. induced in the coil 1. The output from coil 25 is in the form of relatively sharp spikes, and is applied to a shaping circuit 29 in which the positive and negative spikes give rise to a square waveform, indicated at 31, the frequency of which is that of the E.M.F. induced in coil 1. The synchronous detector 21 includes a centre-tapped potentiometer 35 across which the output from the amplifier 15 is applied, and a second centre-tapped potentiometer 37. The first and second outer ends of potentiometer 35 are connected respectively to the first and second outer ends of potentiometer 37 through diodes 39 and 41, and respectively to the second and first outer ends of potentiometer 37 through diodes 43 and 45, which are arranged reversely compared with the diodes 39 and 41, and the output from the circuit 29 is applied between the centre taps on the two potentiometers. The first end of potentiometer 37 is connected through a resistor $R_2$ to output terminal 46, the second end of this potentiometer is connected directly to output terminal 47, and a capacitor $C_2$ is connected between these terminals.

The actual measurement of the output from the synchronous detector is a NUL measurement, a standard voltage from a battery 51 being applied across a potentiometer 52, and the output between terminals 46 and 47 being applied between one end of the potentiometer and, through a galvanometer 55, to the slider of this potentiometer.

In use of the apparatus described above, the output from the coil 1 is fed through the sliprings 7 and 9 to the amplifier 15, the gain of which is inversely proportional to the frequency of the input signal. Since both E.M.F. and frequency of the coil voltage are proportional to speed, it follows that any change in E.M.F. due to speed changes can be compensated exactly by the inverse change of gain which accompanies the change in frequency. It can be shown that if the coil signal is fed to such an amplifier, then under the requisite operating conditions the amplifier output voltage is given by $$V_{out} = \frac{1}{R_1 C_1} K_1 B \sin 2\pi n_0 t$$

where:

$V_{out}$ is the output voltage from the amplifier;
$B$ is the flux density to be measured;
$K_1$ is a global constant which combines the geometric and conversion constants in the fundamental E.M.F. equation;
$n_0$ is the mean speed of rotation of the coil 1 in revolutions per second; and
$t$ denotes time.

It is to be noted that neither the amplifier gain $A$ nor the speed term "$n_0$" appears in the part of this equation which determines the amplitude of the generated voltage.

The necessary conditions for this expression to be true to within one part in 1000 are firstly that constants $R_1$ and $C_1$ be stable to within 1 part in 1000; secondly that amplifier $A > 1000$; and thirdly that $$2\pi n_0 C_1 R_1 (1+A) > 45$$

All these conditions are realisable without difficulty.

It can be further shown that the presence of a non-infinite impedance, $Z_{in}$ shown dotted in the drawing, does not modify the expression for output voltage. Hence $Z_{in}$ need be neither very high nor constant; this factor permits the use of a very simple transistor amplifier.

It can be further shown that the phase of the output voltage, relative to that generated, is for all practical purposes invariable; the amplifier produces a lag of 90°. This constancy of phase may be required for subsequent detection circuitry.

Hence it can be seen that the amplitude of the amplifier output is a measure of the flux density $B$, and independent of all major variables.

The analysis has so far not considered the perturbing effects of vibration or cyclic torque pulsations, which produce spurious motion of the coil in the field. It can be shown mathematically that such variations have negligible effect on the amplitude of the fundamental component of the output; rather they give rise to harmonics, spurious frequencies, and modulation product. Hence if the indicating device at the amplifier output is responsive only to the fundamental component of the signal, and has itself a measuring accuracy of 1 part in 1000, the field has been determined with the desired accuracy.

It is a property of the synchronous detector, of which many circuit configurations are known, that it operates as a synchronous reversing switch, and in its simplest form may actually be a synchronous reversing switch. The synchronous reversal of a signal of fundamental frequency $f_1$ is mathematically equivalent to multiplying it by a unit-amplitude square wave. This equivalent switching wave $V_{(s)}$ has a harmonic content given by $$V_{(s)} = \frac{4}{\pi} \sin 2\pi n_0 t + \frac{1}{3} \sin 6\pi n_0 t + \frac{1}{5} \sin 10\pi n_0 t + \ldots$$

If the signal voltage is free from extraneous frequencies, then the multiplication process yields only one zero frequency term, which is an accurate linear function of the amplitude of the input signal.

If the signal is permitted to have extraneous frequency components and harmonics, then only those components having frequencies $6\pi n_0$, $10\pi n_0$, etcetera, can produce any contribution to the D.C. output, because a zero frequency component can result only by the multiplication of two co-phasal sinusoidal functions of identical frequency.

The most troublesome of such components will be the third harmonic, and one can expect this to have, typically, an amplitude of about 1% of the generated voltage. Because of the inverse frequency characteristic of the amplifier, this will be reduced at the amplifier output to 0.3%, and when multiplied by the 33% third harmonic content of the switching function, is reduced to 0.01%. This is in fact, the highest error, since the D.C. output is further reduced if the phase of the harmonic is not coincident with the phase of the switching function.

Higher-order harmonics will clearly undergo greater relative attenuation; a 1% fifth harmonic will contribute only a 0.004% error to the D.C. output voltage.

There is, ideally, no second-harmonic component in the switching function, so any second harmonic in the coil E.M.F. will not contribute to the D.C. output. It can be shown that the only possible source of second harmonic in the signal is cyclic variation of instantaneous speed, which produces frequency modulation of the coil E.M.F. Again, such variations may conceivably, with normal engineering designs and tolerances, yield about 1% of second harmonic. To produce a 1 part in 1000 error would require a second harmonic content of 20% in the switching waveform. The only possible source of even harmonics in the switching waveform is a non-uniform mark-space ratio. It is easy to hold the mark-space ratio within 5%, at which level the second harmonic content can be shown to be less than 2%. Hence no special precautions need to be taken to provide a high degree of switching symmetry.

The magnetic field measurement is therefore available as a D.C. voltage at the output terminals of the synchronous detector, with the desired accuracy and is measured by a potentiometric technique using the galvanometer 55 and creating a NUL reading thereon by adjustment of the slider of the potentiometer 53.

The manner in which the output from the synchronous detector is utilised can be modified to suit the purpose of the apparatus. Thus the output can be applied to a digital voltmeter or to a servo-operated potentiometer. Further, this output voltage can be used in a feedback system to control or stabilise the value of the magnetic field.

In the specific embodiment of the invention described above, the output from the rotating coil is applied to an amplifier having capacitive negative feedback, operated under the conditions described, which yields an output independent of mean coil speed and amplifier loading, of invariant phase, and whose fundamental component is a highly accurate measure of the field. The synchronous detector serves to abstract only the fundamental component of the amplifier, with a sufficiently high degree of accuracy and linearity. The potentiometer arrangement, for measuring the final voltage, must of course be sufficiently precise to enable the output voltage to be read with the desired degree of accuracy.

The requisite values of resistors $R_1$, $C_1$ are determined by the chosen coil rotational speed, and the values $R_2$, $C_2$ by the desired response time, in accordance with the following relationships:

(1) The magnitude of the amplifier output is given by $$V_{out} = \frac{1}{R_1 C_1} K_1 . B . \sin 2\pi N_o t$$

Hence the product $R_1 C_1$ determines the effective amplifier gain, and this will vary very widely according to the coil design ($K_1$), range of field strength to be measured (B) and the chosen speed ($N_o$).

(2) $R_1 C_1$ having thus been established, the amplifier gain A should be chosen to satisfy the two conditions.

$$A > 1000$$

$$\frac{1}{2\pi N_o C_1 R_1 (1+A)} > 45$$

The values of $R_2 C_2$ are determined by the operating frequency and the response time required, in accordance with (a) $R_2 C_2 \gg 1/N_o$,
(b) If a response time $t_1$ is required $R_2 C_2 \approx 0.3 t_1$.

The motor is not unconditionally synchronous—it may be of any type; in practice this means, in the majority of applications, an induction motor which runs at a speed nearly equal to synchronous.

A 2-pole motor would generate a coil frequency equal to (if synchronous) or nearly equal to (if induction) the mains frequency and render the separation of mains frequency pick-up difficult. It is therefore desirable to run the coil at a speed such, that its generated frequency is well removed from mains frequency. The coil frequency should be below, rather than above, mains frequency so that any pick-up at the latter frequency is attenuated by the falling amplifier response.

The reference input to the synchronous detector is most easily provided:

(a) If the motor is synchronous, by derivation from the mains;
(b) If the motor is asynchronous, from a magnet and pick-up coil.

It is not essential for the motor 5 to be electrically driven—e.g. an air turbine can be used.

What we claim is:

1. Circuit means for the purpose of providing a signal representative of the magnetic flux density in a magnetic field comprising
    (a) an electrical pick-up coil arranged in the magnetic field;
    (b) driving means by which the coil is continuously rotated in use at a substantially uniform speed;
    (c) an amplifier to which the E.M.F. from the coil is applied as input and having capacitive negative feedback and arranged to yield an output with a gain which decreases inversely in magnitude with an increase in the frequency of the input to the amplifier;
    (d) a synchronous detector to which the output from the amplifier is applied as input and which serves to block substantially all frequencies which are harmonics of the basic frequency of rotation of the coil; and
    (e) output means arranged to receive the output from the synchronous detector and to provide the said signal representative of the magnitude of the magnetic field.

2. Circuitry means according to claim 1, in which:
    (a) a prime mover is arranged to act as the driving means for the coil;
    (b) an electrical generator is driven by the prime mover in unison with the coil;
    (c) this electrical generator provides a cyclically varying output signal the frequency of which is equal at all times to the basic frequency of the voltage induced in the coil; and
    (d) the synchronous detector is arranged to receive this output signal as a second input and to utilise the frequency of this signal in the rejecting of frequencies which are harmonics of the basic frequency.

3. Circuit means according to claim 2, in which the electrical generator includes a permanent magnet rotating in unison with the coil and a fixed generator coil in which the magnet is arranged to induce the cyclically varying output signal.

4. Circuit means according to claim 3, in which a shaping circuit is arranged to receive the output from the electrical generator coil and to provide as output a square wave waveform having a frequency equal to that of the electrical generator coil.

5. Circuit means as claimed in claim 1, in which the synchronous detector includes:
    (a) a centre tapped input resistor, across which the output from the amplifier is applied;
    (b) a centre tapped output resistor;
    (c) two first diodes arranged in the same sense to connect respectively the two ends of the output resistor to the corresponding two ends of the input resistor;
    (d) two second diodes arranged to connect respectively the two ends of the output resistor to the non-corresponding ends of the input resistor, and arranged in a sense opposite to the sense of the two first diodes;
    (e) means applying a reference frequency signal between the two centre taps respectively on the two resistors; and
    (f) means taking the output from the synchronous detector from the two ends of the output resistor.

6. Circuit means as claimed in claim 1, in which the output means is a NUL detector.

7. Circuit means as claimed in claim 6, in which the NUL detector comprises:
    (a) a potentiometer across which is applied a steady D.C. reference voltage;
    (b) a smoothing circuit to which the output from the synchronous detector is applied to produce a D.C. voltage; and
    (c) a galvanometer connected to the output of the smoothing circuit and to the tapping on the potentiometer and reducible to a NUL position by movement of that tapping;

whereby the position of the tapping provides the indication of the magnitude of the magnetic flux density.

No references cited.

RUDOLPH V. ROLINEC, *Primary Examiner.*

R. J. CORCORAN, *Assistant Examiner.*